Oct. 3, 1967  L. COES, JR  3,344,657
WHEEL SIZE CONTROL
Filed Sept. 10, 1965  3 Sheets-Sheet 1
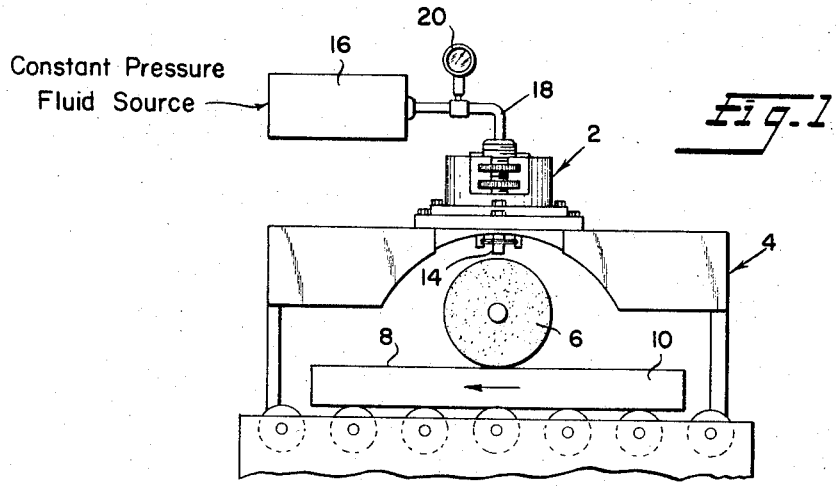
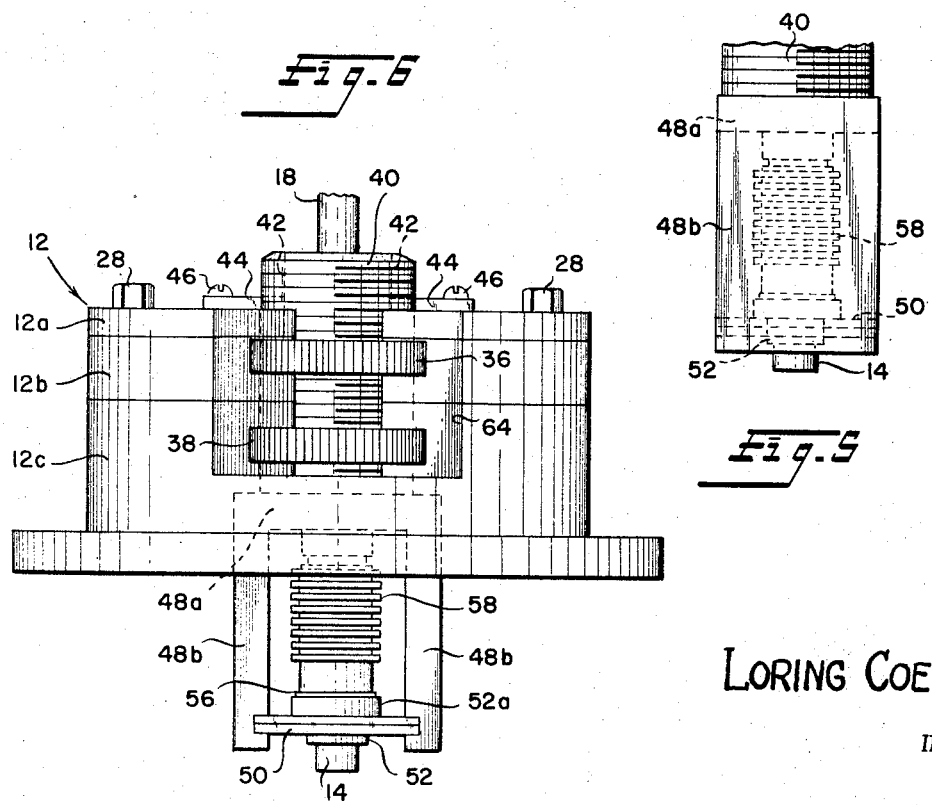
LORING COES, JR.
INVENTOR
BY Allan R. Redrow
ATTORNEY

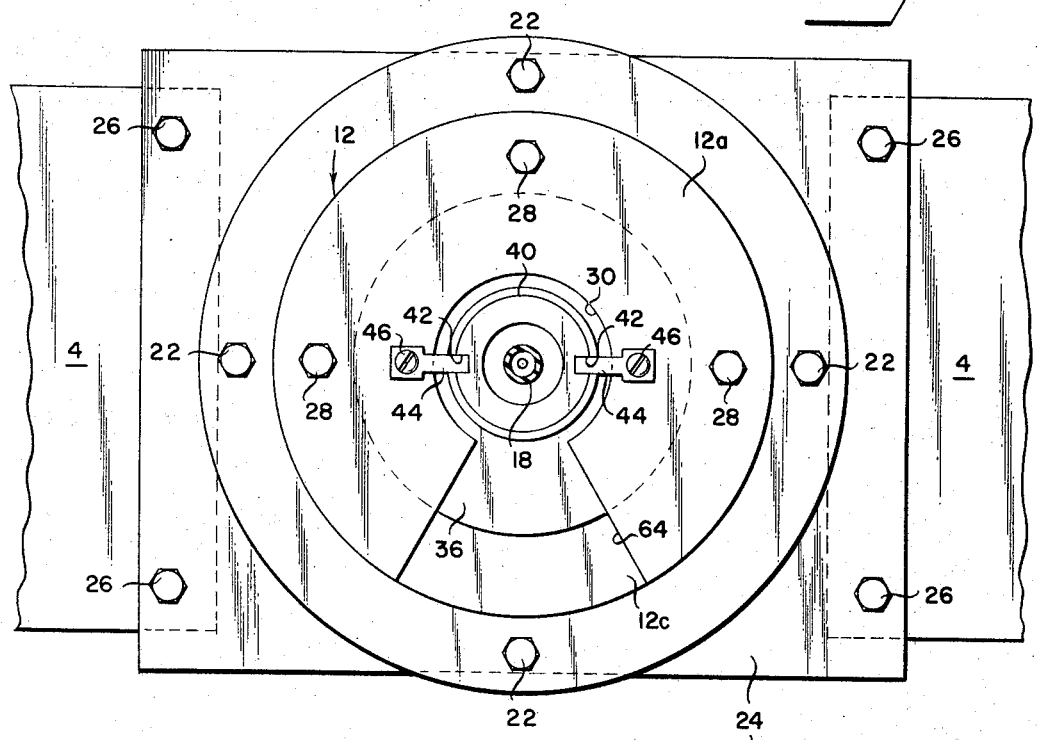
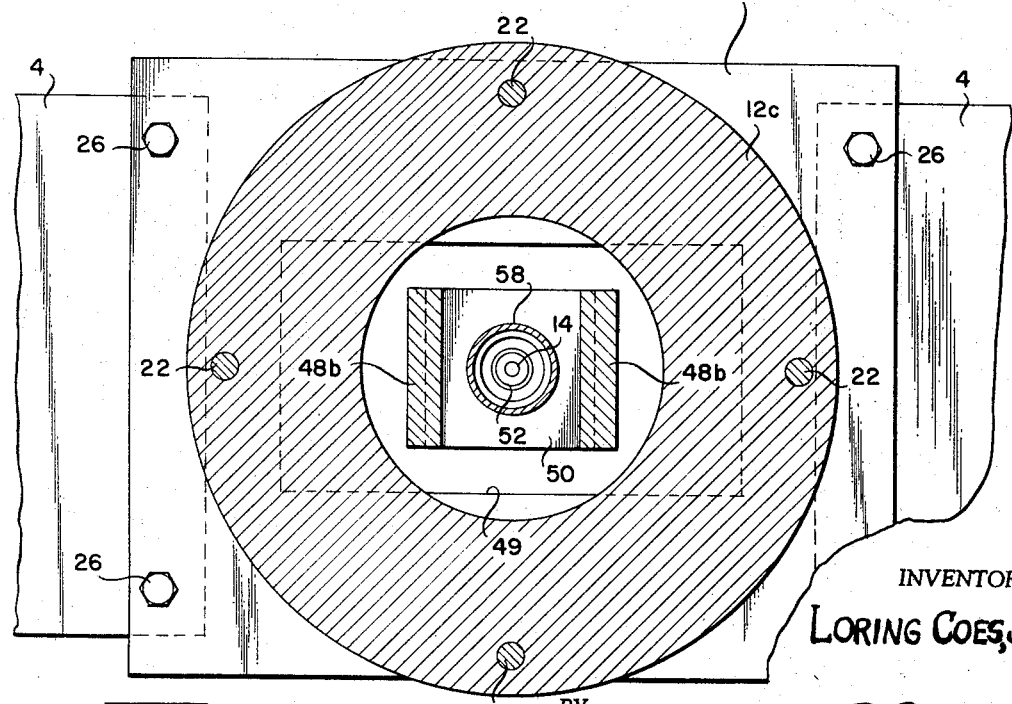

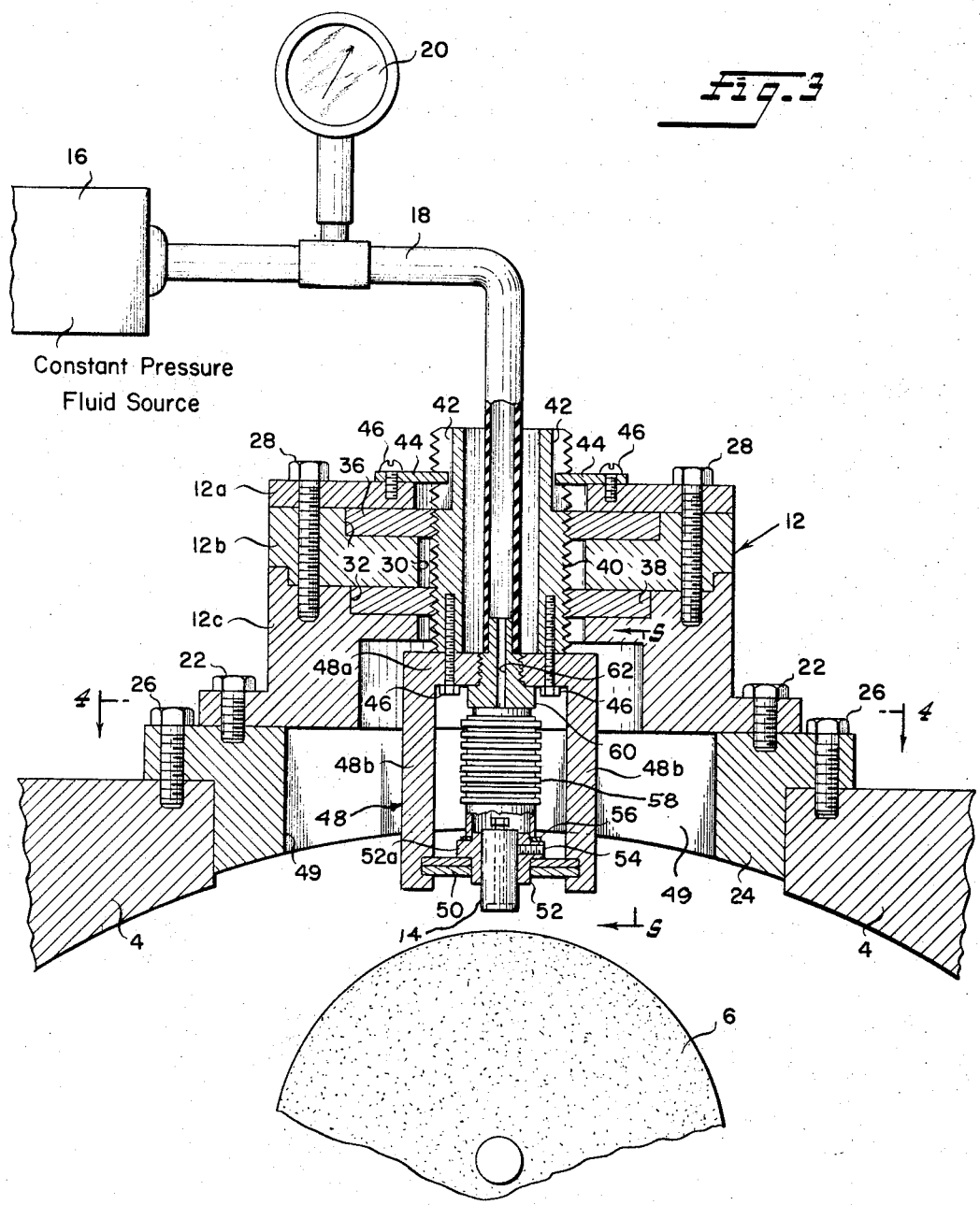

United States Patent Office 3,344,657
Patented Oct. 3, 1967

3,344,657
WHEEL SIZE CONTROL
Loring Coes, Jr., Princeton, Mass., assignor to Norton Company, Worcester, Mass., a corporation of Massachusetts
Filed Sept. 10, 1965, Ser. No. 486,341
12 Claims. (Cl. 73—37.6)

ABSTRACT OF THE DISCLOSURE

Apparatus making use of a gauge wherein a constant flow of fluid is monitored to measure changes in dimension of an object placed in front of a nozzle through which the fluid flows, having temperature responsive means associated with the nozzle to compensate for changes in viscosity of the fluid and to compensate for dimensional changes in the nozzle itself when the ambient temperature changes.

---

This invention relates generally to fluid gaging apparatus for monitoring the dimensional changes in the diameter of a grinding wheel, and more particularly to improved fluid gaging apparatus including temperature-responsive means for compensating for the deleterious changes in system parameters caused by the temperature variations which occur during a grinding operation.

In the patented prior art, many types of measuring or testing devices have been disclosed in which pressure fluid is utilized for measuring the dimensional changes of a grinding tool, workpiece or the like. The present invention relates to a system of the type in which a continuous jet or blast of constant pressure fluid is directed by a stationary nozzle radially against the periphery of a rotary grinding wheel that is driven at a high rotational velocity in contact with a workpiece. The back pressure of the constant pressure fluid supplied to the nozzle is monitored by gage means to indicate the reduction in the diameter of the wheel as a result of wear during extended use.

In current high precision machining operations, it is not uncommon to require an accuracy within forty millionths of an inch. In some cases, the accuracy in a grinding machine can be destroyed merely by the operator leaning against the machine while it is performing the grinding operation. Although the aforementioned fluid type measuring system offers an extremely sensitive means for monitoring the diameter of the grinding wheel to afford the desired extremely accurate grinding operation, the temperature variations (on the order of 100° C. or more) resulting from the heat generated by the grinding wheel adversely affects certain parameters of the system which reduces the accuracy of measurement. For example, variations in the length of the stationary nozzle with temperature change cause corresponding variations in the gap distance between the nozzle orifice and the wheel periphery, thereby adversely affecting the accuracy of measurement. Another parameter affected by ehat is the viscosity of the measuring fluid. When the fluid is a gas, the heat generated during a grinding operation causes an increase in viscosity, while when the fluid is a liquid such as oil, the generated heat causes a decrease in viscosity. Although the variation in length of the nozzle could conceivably be avoided by the use of a probe having a zero temperature coefficient of expansion, the change in the viscosity of the measuring fluid presents a more difficult problem. The present invention was developed to avoid the above and other drawbacks of the known fluid type measuring systems by providing temperature responsive means which automatically compensate for variations in system parameters (such as variations in fluid viscosity and/or nozzle dimensions) that result from the heat generated during grinding.

Accordingly, the primary object of the present invention is to provide an improved fluid type measuring system for monitoring the diameter of a grinding wheel during use, said invention being characterized by the provision of temperature responsive means for automatically varying the position of the nozzle relative to the wheel to compensate for variations in the viscosity of the fluid and the dimensions of the nozzle resulting from the heat generated during the grinding. In the illustrated embodiment, the nozzle is mounted on a bimetallic element which flexes in a given direction upon temperature change to vary the nozzle position relative to the wheel.

A more specific object of the invention is to provide a fluid measuring system including a housing adapted for mounting upon the grinding wheel frame, and means connected with the housing for supporting the nozzle relative to the rotary grinding wheel against the periphery of which the nozzle directs a monitored blast of constant pressure fluid. The support means comprises manually adjustable yoke means for longitudinally adjusting the nozzle relative to the wheel, and temperature responsive means for automatically adjusting the longitudinal position of the nozzle relative to the yoke means. In order to permit the longitudinal adjustment of the nozzle relative to the adjustable yoke means, the nozzle is supplied with constant pressure fluid through flexible or expansible means, such as a fluid-tight bellows.

According to a further object of the invention, the nozzle is connected with a rigid yoke member by means of a bimetallic element arranged transversely to the longitudinal axis of the nozzle, and the yoke in turn includes a threaded sleeve that is mounted for movement longitudinally of the nozzle in a bore contained in the housing that is rigidly secured to the grinding wheel frame. An adjusting nut rotatably supported in the housing is threaded upon the sleeve to effect longitudinal adjustment of the sleeve, yoke, bimetallic element and nozzle relative to the grinding wheel. Lock nut means are also rotatably mounted in the housing in threaded engagement with the sleeve to lock the sleeve in place following adjustment thereof by the adjusting nut. By proper mounting of the bimetallic element, the element flexes in such a direction as to compensate for variations in the parameters of the system whether the fluid thereof be a gas or a liquid, and whether the probe is formed of a material having either a zero or a large coefficient of expansion. As a consequence of the invention, a linear response may be obtained between the reading of gage means measuring the back pressure of the constant pressure fluid supplied to the nozzle and the variation in diameter of the grinding wheel. Furthermore, the use of any type of commercially available nozzle is permitted.

Other objects and advantages of the invention will become apparent from a study of the following specification when considered in conjunction with the accompanying drawing, in which:

FIGURE 1 is a diagrammatic illustration of the grinding wheel diameter monitoring apparatus of the subject invention;

FIGURE 2 is a detailed top plan view of the monitoring apparatus secured in an opening in the grinding wheel frame;

FIGURE 3 is a sectional view taken along line 3—3 of FIGURE 2;

FIGURES 4 and 5 are sectional views taken along lines 4—4 and 5—5 of FIGURE 3, respectively; and FIGURE 6 is a side elevational view of the monitoring apparatus removed from the grinding wheel frame.

Referring first to FIGURE 1, the monitoring apparatus 2 of the subject invention is adapted for mounting on a grinding wheel frame 4 to monitor the diameter of a rotatably driven grinding wheel 6 that is supported by the frame in a position to have grinding engagement with the adjacent surface 8 of a workpiece 10. The monitoring apparatus includes a housing 12 which supports a nozzle 14 that is spaced from, and directs a continuous jet of constant pressure fluid against, the peripheral grinding surface of the wheel 6. A liquid or gaseous fluid, such as air or water, is supplied to the nozzle 14 from a constant pressure fluid source 16 via a conduit 18. A fluid pressure gage 20 is connected with conduit 18 to measure the back pressure established by the fluid jet that is emitted from nozzle 14. Reductions in the diameter of the grinding wheel caused by wear during extended grinding operations produce a change in the back pressure in conduit 18 that is monitored by the gage 20.

Referring now to FIGURES 2–4, the housing 12 is connected by bolts 22 with a wheel guard 24 that is secured by bolts 26 in an opening in the frame 4 above the grinding wheel 6. The housing 12 consists of three colinearly arranged annular sections 12a, 12b and 12c that are rigidly connected as a unit by bolts 28. The housing 12 contains a longitudinal bore 30 the wall of which contains a pair of axially-spaced, parallel, generally annular grooves 32 that rotatably support annular adjusting nut 36 and annular locking nut 38, respectively. These nuts 36 and 38 are threadably mounted upon an externally threaded sleeve 40 that is arranged coaxially within, and is concentrically spaced from the wall of, the housing bore 30. At its upper end, the sleeve 40 contains axially extending key slots 42 which receive keys 44 that are rigidly secured by screws 46 to the housing upper section 12a.

Secured to the lower end of sleeve 40 by bolts 46 is the bridging portion 48a of a rigid U-shaped yoke 48 having a pair of legs 48b that extend downwardly through a centrally-arranged opening 49 contained in wheel guard 24. Mounted between the free extremities of the legs 48b is a bimetallic element 50 the central portion of which contains an opening receiving a tubular sleeve 52. The sleeve 52 is provided on its outer periphery with an annular flange that is seated upon the upper surface of the bimetallic element and serves as a stop. Secured within sleeve 52 by lock screw 54 is the downwardly directed fluid nozzle 14. Mounted upon sleeve 52 in contact with flange 52a is a resilient washer 56 (formed of neoprene, for example) that supports in fluid tight engagement the lower end of a bellows 58 that is fitted concentrically upon the upper end of sleeve 52. The upper end of the bellows 58 is secured in fluid tight engagement with an externally threaded nipple 60 that is rigidly mounted in and extends through a threaded bore centrally contained within the bridging portion 48a of yoke 48. The nipple 60 contains a through passage 62 and is provided at its upper end with a tubular extension that is received within the adjacent end of conduit 18.

As shown in FIGURES 2 and 6, the upper portion of housing 12 contains a vertical through slot 64 that provides access to the rotatably mounted adjusting and locking nuts 36 and 38, respectively.

*Operation*

Assume that the constant pressure fluid is air and that the bimetallic element 50 is so arranged that upon an increase in temperature, the central portion of the element flexes upwardly in the direction of the bridging portion 48a of yoke 48.

Initially the nuts 36 and 38 are simultaneously rotated to vertically adjust as a unit relative to the grinding wheel 6 the sleeve 40, yoke 48, bimetallic element 50, nozzle 14, bellows 58 and nipple 60. The nuts are so adjusted that the spacing between the nozzle 14 and the periphery of wheel 6 establishes a desired back pressure in conduit 18 as indicated by gage 20. Following proper positioning the nozzle relative to the wheel, the lock nut 438 is rotated slightly relative to the adjusting nut 36 to lock the threaded sleeve 40 in place. Constant pressure fluid is supplied to nozzle 14 via conduit 18, passage 62, and bellows 58.

In the event that the peripheral surface of the grinding wheel becomes worn during use, the distance between the nozzle orifice and the grinding wheel peripheral surface increases, whereupon the back pressure in conduit 18 is reduced and the reading on gage 20 varies accordingly. By appropriate calibration of the gage, the dimensional change in the diameter of the grinding wheel may be read directly as a unit of length measure.

In the event that the temperature increases as a result of the heat generated during grinding, the viscosity of the gaseous fluid decreases and the length of the nozzle increases. These parameter variations are compensated for by the flexing of the central portion of the bimetallic element 50 in the direction of the yoke bridging portion 48a. By proper arrangement and design of the bimetallic element, this flexure may be caused to precisely compensate for the variation in fluid viscosity and dimensional changes of the nozzle, thereby maintaining constant the pressure of the air jet directed against the wheel and the back pressure of the fluid in conduit 18. As a consequence of the temperature compensating means, a linear relationship is obtained between the gap width and the pressure indicated on gage 20.

When a liquid such as oil is used as the constant pressure fluid, the decrease in viscosity may overcompensate for the increase in the length of the nozzle upon an increase in temperature. In this event, the bimetallic element 50 may be so mounted that the central portion thereof flexes downwardly away from the yoke bridging portion 48a with an increase in temperature. Owing to the provision of the bellows 58, or equivalent flexible fluid-tight connection, variation of the spacing distance between the nozzle 50 and the nipple 60 is permitted without appreciable variation in the back pressure of the fluid in conduit 18.

During laboratory testing of the monitoring apparatus, it has been found that the porosity of the grinding wheel and the provision of coolants have less effect with a liquid fluid than with a gaseous fluid. By proper calibration and adjustment, a linear relationship between the width of the gap between the nozzle and the wheel and the indicated pressure was achieved both with liquid and gaseous fluids.

While in accordance with the provisions of the patent statutes the preferred form and embodiment of the invention has been illustrated and described, it will be apparent to those skilled in the art that changes may be made in the apparatus described without deviating from the invention set forth in the following claims.

What is claimed is:

1. Apparatus for monitoring variations in the diameter of a grinding wheel rotatably mounted in a frame for grinding a work surface, comprising
    means including a nozzle for directing a continuous jet of constant pressure fluid against the periphery of the wheel;
    a housing adapted for connection with said frame adjacent said wheel;
    nozzle support means adjustably connected with respect to said housing for longitudinal movement of the nozzle relative to said housing;
    temperature-responsive means connecting said nozzle to said support means for longitudinal movement of said nozzle relative to said support means by an amount dependent on changes in temperature; and
    means for monitoring the back pressure of the fluid supplied to said nozzle.

2. Apparatus as defined in claim 1, wherein said first mentioned means comprises a source of constant pressure fluid, bellows means connected at a first end with said nozzle, and conduit means connecting the second end of said bellows means with said fluid source.

3. Apparatus as defined in claim 2 wherein said back pressure monitoring means comprises a fluid pressure gage connected with said conduit means.

4. Apparatus as defined in claim 2 wherein said housing contains a bore arranged longitudinally relative to a line extending radially from the center of said wheel; and further wherein said support means includes an externally threaded tubular sleeve extending axially into, and concentrically spaced from the wall of, said housing bore; means for guiding said sleeve solely for axial movement relative to said housing bore; and an adjusting nut threadably mounted upon the outer periphery of said sleeve and rotatably supported within said housing; said nozzle being carried by said sleeve whereby upon rotation of said nut relative to said housing, said sleeve is longitudinally displaced in said bore.

5. Apparatus as defined in claim 4, and further including a lock nut threadably mounted upon the outer periphery of said sleeve and rotatably supported within said housing, said lock nut being axially spaced from said adjusting nut.

6. Apparatus as defined in claim 5 wherein the wall of the housing bore contains a pair of parallel spaced generally annular grooves rotatably supporting said nuts, respectively, said grooves having thicknesses substantially equal to the thicknesses of said nuts, respectively.

7. Apparatus as defined in claim 6 wherein said housing contains an axially extending through slot affording access to said nuts to permit manual rotation of the same.

8. Apparatus as defined in claim 4, wherein said support means further includes a rigid U-shaped yoke having a pair of leg portions connected at one end by a bridging portion, said bridging portion being rigidly connected with that end of said sleeve that is adjacent said wheel, said leg portions carrying said nozzle and extending in the direction of said wheel.

9. Apparatus as defined in claim 8 wherein said temperature responsive means comprises a bimetallic element supported between the nozzle and the free ends of the leg portions of said yoke.

10. Apparatus as defined in claim 9, wherein said second end of said bellows means is rigidly connected with the bridging portion of said yoke, and wherein said first end of said bellows and said nozzle are supported by the central portion of said bimetallic element.

11. Apparatus as defined in claim 10, wherein the central portion of said bimetallic element contains an opening receiving the free extremity of said nozzle, and further including stop means preventing axial movement of said nozzle relative to said bimetallic element in the direction of said grinding wheel.

12. Apparatus as defined in claim 11, wherein when said fluid is air said bimetallic element is so supported by the yoke that upon increase in temperature, the central portion of said bimetallic element flexes to move the nozzle in the direction of the bridging portion of said yoke.

No references cited.

LOUIS R. PRINCE, *Primary Examiner.*

W. A. HENRY, *Assistant Examiner.*